(12) United States Patent
Murayama

(10) Patent No.: US 12,209,648 B2
(45) Date of Patent: Jan. 28, 2025

(54) TOOTH PROFILE DESIGNING METHOD FOR STRAIN WAVE GEARING

(71) Applicant: HARMONIC DRIVE SYSTEMS INC., Tokyo (JP)

(72) Inventor: Yuya Murayama, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/549,650

(22) PCT Filed: Jun. 1, 2021

(86) PCT No.: PCT/JP2021/020902
§ 371 (c)(1),
(2) Date: Sep. 8, 2023

(87) PCT Pub. No.: WO2022/254586
PCT Pub. Date: Dec. 8, 2022

(65) Prior Publication Data
US 2024/0159305 A1   May 16, 2024

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01)

(58) Field of Classification Search
CPC .................................................. F16H 49/001
(Continued)

(56) References Cited

U.S. PATENT DOCUMENTS 5,687,620 A * 11/1997 Ishikawa ............. F16H 55/0833
74/462
5,782,143 A * 7/1998 Ishikawa ............. F16H 55/0833
74/640
(Continued)

FOREIGN PATENT DOCUMENTS

JP   H0784896 B2   9/1995
JP   2612585 B2   5/1997
(Continued)

OTHER PUBLICATIONS

International Search Report (PCT/ISA/210) with English translation and Written Opinion (PCT/ISA/237) mailed on Aug. 17, 2021, by the Japanese Patent Office as the International Searching Authority for International Application No. PCT/JP2021/020902.

*Primary Examiner* — Ha Dinh Ho
(74) *Attorney, Agent, or Firm* — Buchanan Ingersoll & Rooney PC

(57) ABSTRACT

According to a tooth profile designing method for a strain wave gear device, a first curve from a point A ($\varphi=0$) to a point B ($\varphi=\pi/2$) in a moving locus of external teeth with respect to internal teeth is extracted. A similarity curve is obtained by multiplying the first curve by $(1-\lambda)$ using the point B as a center of similarity, and a second curve is obtained by rotating the similarity curve by 180° about a midpoint C between the point A and the point B as a center of similarity. A third curve is obtained by multiplying only the x-coordinate of the second curve by $\alpha$ ($\alpha<1$), or a fourth curve is obtained by multiplying only the y-coordinate of the second curve by $\beta$ ($\beta>1$). An addendum tooth profile of the external teeth is defined using the third curve or the fourth curve.

3 Claims, 4 Drawing Sheets

(58) Field of Classification Search
USPC ............................................................ 74/640
See application file for complete search history.

(56) References Cited

U.S. PATENT DOCUMENTS

| | | | |
|---|---|---|---|
| 5,918,508 A * | 7/1999 | Ishikawa ............. | F16H 55/0833 |
| | | | 74/462 |
| 7,328,632 B2 * | 2/2008 | Ishikawa ............. | F16H 55/0833 |
| | | | 74/640 |
| 7,530,292 B2 * | 5/2009 | Ishikawa ............. | F16H 55/0833 |
| | | | 74/640 |
| 9,903,459 B2 * | 2/2018 | Ishikawa ............. | F16H 55/0833 |
| 10,253,862 B2 * | 4/2019 | Kiyosawa ................. | F16H 1/32 |
| 10,788,115 B2 * | 9/2020 | Ishikawa ............... | F16H 49/001 |
| 2007/0180947 A1 | 8/2007 | Ishikawa et al. | |
| 2007/0266819 A1 * | 11/2007 | Ishikawa ............. | F16H 55/0833 |
| | | | 475/180 |

FOREIGN PATENT DOCUMENTS

| | | | |
|---|---|---|---|
| JP | 2675853 | B2 | 11/1997 |
| JP | 3230595 | B2 | 11/2001 |
| JP | 3942249 | B2 | 7/2007 |
| JP | 2007211907 | A | 8/2007 |
| JP | 2020012532 | A | 1/2020 |

* cited by examiner

IH TOOTH PROFILES WHEN λ=0.65

MESHING OF IH TOOTH PROFILES WHEN λ=0.65

PROPOSED TOOTH PROFILES
WHEN $\lambda=0.5$ AND $\alpha=0.7$

MESHING OF PROPOSED TOOTH PROFILES
WHEN $\lambda=0.5$ AND $\alpha=0.7$

RELATIONSHIP BETWEEN $\theta$ AND $\phi$
WHEN $\lambda=0.5$ AND $\alpha=0.7$

TOOTH PROFILE DESIGNING METHOD FOR STRAIN WAVE GEARING

TECHNICAL FIELD

The present invention relates to a method for designing tooth profiles of a rigid internally toothed gear and a flexible externally toothed gear in a strain wave gearing.

BACKGROUND ART

JP 2055418 B2 proposes a means for increasing rotational accuracy and load capacity in a strain wave gearing. The means is a tooth profile with which a locus over which an externally toothed gear moves with respect to an internally toothed gear is utilized, whereby the gears can mesh in a wide range in the circumferential direction. By increasing the number of teeth in mesh at the same time, tooth profile errors are averaged to increase precision, and the load is distributed whereby the stress on each tooth decreases, thereby realizing a higher load capacity. In the strain wave gearing of the present specification, the tooth profile obtained by a technique of using the locus over which the externally toothed gear moves with respect to the internally toothed gear as the tooth profile is referred to as an IH tooth profile.

Patents for various tooth profiles have been granted on the basis of the aforementioned technique of using the moving locus for the tooth profile. For example, in JP 2055418 B2, which was mentioned above, ½ of the moving locus was used for the tooth profile, whereas in JP 2675853 B2, $\lambda$ times ($\lambda$ being a positive value less than 1) of the moving locus is used for the tooth profile, which is more generalized. In addition, there are many patents such as JP 2612585 B2, JP 3230595 B2, and JP 3942249 B2 in which A times of the moving locus is used.

PRIOR ART LITERATURE

Patent Documents

[Patent Document 1] JP 2055418 B2
[Patent Document 2] JP 2612585 B2
[Patent Document 3] JP 2675853 B2
[Patent Document 4] JP 3230595 B2
[Patent Document 5] JP 3942249 B2

DISCLOSURE OF THE INVENTION

Problems to be Solved by the Invention

In a strain wave gearing, reduction of stress in the dedendum of the externally toothed gear is required in order to further increase the load capacity of the internally toothed gear and the externally toothed gear. The dedendum stress is mainly divided into tensile stress due to torque and bending stress due to elliptical deformation. In load distribution achieved using an IH tooth profile, the tensile load due to torque is dispersed and the value is reduced. Widening the root portion is effective in reducing bending stress.

To widen the root in an IH tooth profile for the purpose of reducing bending stress, the value of $\lambda$ must be increased, the tip portions of the external teeth of the externally toothed gear used in meshing must be made smaller, and the shape of the teeth on the dedendum side must be made thinner. Once such measures have been adopted, only a narrow range of the tips of the external teeth can be used; therefore, wear and pitching of the external teeth may occur. In addition, since the meshing point is only on the tip side, the stress in the direction in which the external teeth fall may increase.

In view of these matters, it is an object of the present invention to provide a tooth profile designing method for a strain wave gearing for obtaining a tooth profile with which the roots of the external teeth of the externally toothed gear can be widened and a larger portion of each tooth face can be used for meshing while improving the IH tooth profile technique and maintaining a wide-range mesh.

Means of Solving the Problems

According to the present invention, there is provided a tooth profile designing method for a strain wave gearing comprising a rigid internally toothed gear, a flexible externally toothed gear, and a wave generator that causes the externally toothed gear to flex into an ellipsoidal shape and mesh with the internally toothed gear at locations including positions on a major axis of the ellipsoidal shape, and causes the positions where the externally toothed gear meshes with the internally toothed gear to move in a circumferential direction, said tooth profile designing method characterized in that:

designating the rotation angle of the wave generator as $\varphi$ and focusing on internal teeth of the internally toothed gear and external teeth of the externally toothed gear positioned on the major axis when $\varphi=0$, a locus over which the external teeth move with respect to the internal teeth, obtained while the wave generator is rotating from $\varphi=0$ to $\varphi=\varphi1$ ($0<\varphi1\leq\pi/2$), is determined as a first curve;

designating the endpoint of the first curve when $\varphi=0$ as point A, the endpoint when $\varphi=\varphi1$ as point B, the midpoint between point A and point B as point C, and $\lambda$ as a positive value less than 1, a similarity curve for which the first curve is multiplied by $(1-\lambda)$ using point B as a center of similarity is determined, and a second curve for which the similarity curve is rotated 180 degrees about the point C is determined;

designating $\alpha$ as a positive value less than 1 and $\beta$ as a positive value greater than 1, and also designating a curve obtained by multiplying only the x coordinate of the second curve by $\alpha$ as a third curve and a curve obtained by multiplying only the y coordinate of the second curve by $\beta$ as a fourth curve, either one of the third curve and the fourth curve is determined and an addendum profile of the external teeth is defined using the resulting curve;

an addendum profile of the internally toothed gear is defined by a curve enveloping the addendum profile of the external teeth; and a dedendum profile of the external teeth and a dedendum profile of the internal teeth are each set to a shape that does not interfere with the counterpart addendum profile.

Effects of the Invention

According to the method of present invention, it is possible to obtain a tooth profile with which the roots of the external teeth can be widened and a larger portion of each face of the external teeth can be used in meshing while maintaining a wide-range mesh provided by a tooth profile designing technique of using a moving locus.

MODE FOR CARRYING OUT THE INVENTION

[Configuration of Strain Wave Gearing]

Figure 1B:
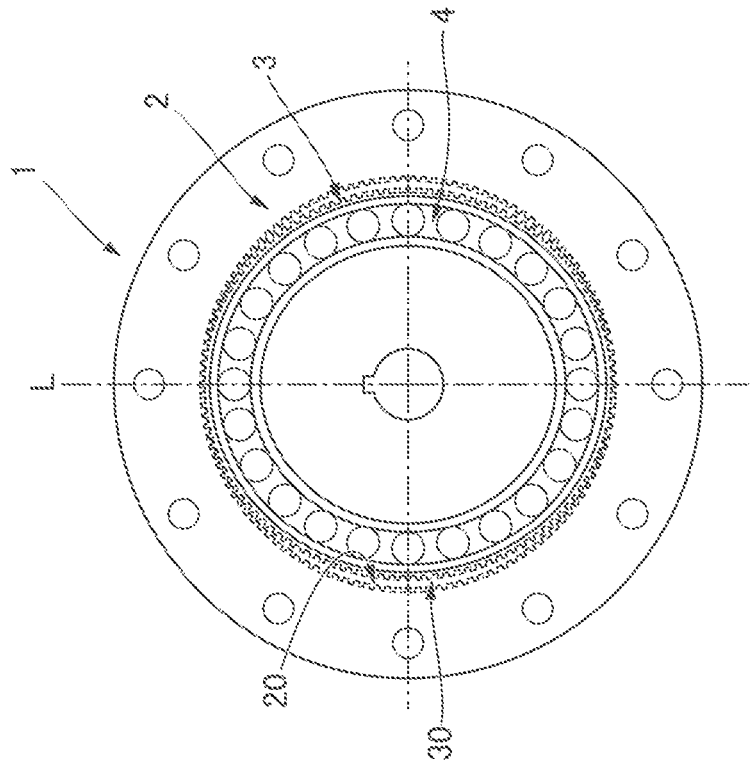
FIG. 1B is an explanatory drawing of an end surface of a strain wave gearing.
Figure 1A:
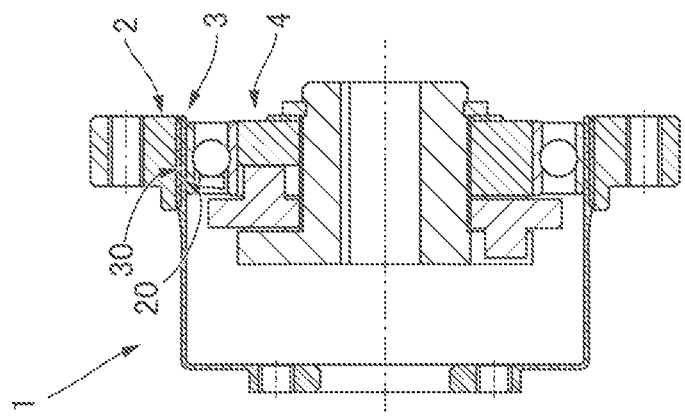
FIG. 1A is an explanatory drawing of a cross section of a strain wave gearing.

FIGS. 1A and 1B are explanatory drawings of an example of a strain wave gearing to which the present invention can be applied. The example shown is of a cup-profile strain wave gearing including a cup-shaped externally toothed gear, but the present invention can be similarly applied to a top-hat-profile strain wave gearing including a top-hat-shaped externally toothed gear, or a flat-profile strain wave gearing including a cylindrical externally toothed gear.

A strain wave gearing 1 has a rigid internally toothed gear 2, a flexible externally toothed gear 3 disposed coaxially inside the internally toothed gear, and an ellipsoidally contoured wave generator 4 fitted inside the externally toothed gear 3. The externally toothed gear 3 is caused to flex in an ellipsoidal shape by the wave generator 4, and external teeth 30 of the externally toothed gear 3 mesh with internal teeth 20 of the internally toothed gear 2 at the positions of both ends of the major axis L of the ellipsoidal shape. The number of teeth of the internally toothed gear 2 is 2π (π being a positive integer) greater than the number of teeth of the externally toothed gear 3. When the wave generator 4 rotates, relative rotation corresponding to the difference in the number of teeth occurs between the internally toothed gear 2 and the externally toothed gear 3. When the internally toothed gear 2 is fixed in a state of not rotating, reduced rotation is extracted from the externally toothed gear 3 to a load side (not shown). The internally toothed gear 2 and the externally toothed gear 3 are both spur gears of module m. The amount of radial flexure of the externally toothed gear 3 is 2κmn. κ is a deviation coefficient, and is in the range of, for example, 0.6<κ<1.4 in practical use.

[IH Tooth Profile Technique]

First, the IH tooth profile technique upon which the present invention is premised shall be described.

The rotation angle of the wave generator in the strain wave gearing is φ. The description below shall be focused on the internal teeth of the internally toothed gear and the external teeth of the externally toothed gear on the major axis when φ=0. The locus over which the external teeth move with respect to the internal teeth, which is obtained when the wave generator is caused to rotate between 0 and π/2, is designated as curve I (formula 1). In the IH tooth profile technique, a curved portion of part of the moving locus may be used, in which case the range of φ would be narrower than the range 0 to π/2.

$$\begin{bmatrix} x_l \\ y_l \end{bmatrix} = \begin{bmatrix} p(\phi) \\ q(\phi) \end{bmatrix} \quad 0 \leq \phi \leq \frac{\pi}{2} \quad \text{Formula 1}$$

The endpoint of curve I when φ=0 is designated as point A and the endpoint of curve I when φ=π/2 is designated as point B. The midpoint between point A and point B is designated as point C. Using a similarity curve obtained by multiplying curve I by λ (0<λ<1) using point B as a center of similarity, an addendum profile of the internal teeth of the internally toothed gear is defined (formula 2). A parameter representing the tooth profile shape is designated as θ.

$$\begin{bmatrix} x_{ca} \\ y_{ca} \end{bmatrix} = \begin{bmatrix} \lambda p(\theta) + (1-\lambda)p\left(\frac{\pi}{2}\right) \\ \lambda q(\theta) + (1-\lambda)q\left(\frac{\pi}{2}\right) \end{bmatrix} \quad 0 \leq \theta \leq \frac{\pi}{2} \quad \text{Formula 2}$$

Using point B as the center of similarity, curve I is multiplied by (1−λ) to determine a similarity curve. This similarity curve is rotated 180 degrees about point C, and the resulting curve is used to define an addendum profile of the external teeth of the externally toothed gear (formula 3).

$$\begin{bmatrix} x_{fa} \\ y_{fa} \end{bmatrix} = \begin{bmatrix} -(1-\lambda)p(\theta) + p(0) + (1-\lambda)p\left(\frac{\pi}{2}\right) \\ -(1-\lambda)q(\theta) + q(0) + (1-\lambda)q\left(\frac{\pi}{2}\right) \end{bmatrix} \quad 0 \leq \theta \leq \frac{\pi}{2} \quad \text{Formula 3}$$

A dedendum profile of the internal teeth and a dedendum profile of the external teeth are set to a shape that does not interfere with the counterpart addendum profile.

(Proof of Continuous Contact of IH Tooth Profile)

Since the internally toothed gear and the externally toothed gear of the strain wave gearing have a large number of teeth, the meshing of the teeth of both gears can be approximated to the meshing of a rack, assuming that the number of teeth is infinite. Using rack approximation eliminates the factor of tooth inclination, so when the apex of the addendum profile of the external teeth (formula 3) moves along the moving locus (formula 1), an external tooth addendum profile group can be expressed as formula 4.

$$\begin{bmatrix} x_{fag} \\ y_{fag} \end{bmatrix} = \begin{bmatrix} x_{fa}(\phi) - x_{fa}\left(\frac{\pi}{2}\right) \\ y_{fa}(\phi) - y_{fa}\left(\frac{\pi}{2}\right) \end{bmatrix} + \begin{bmatrix} x_l \\ y_l \end{bmatrix} \quad \text{Formula 4}$$

$$\begin{bmatrix} -(1-\lambda)p(\theta) + p(0) + (1-\lambda)p\left(\frac{\pi}{2}\right) + p(\phi) - p(0) \\ -(1-\lambda)q(\theta) + q(0) + (1-\lambda)q\left(\frac{\pi}{2}\right) + q(\phi) - q(0) \end{bmatrix}$$

Envelope points of the external tooth addendum profile group are meshing points. A condition for the envelope of the external tooth addendum profile group is that the Jacobian for formula 4 is zero, which is shown by formula 5.

$$\frac{\partial x_{fag}}{\partial \phi}\frac{\partial y_{fag}}{\partial \theta} - \frac{\partial x_{fag}}{\partial \theta}\frac{\partial y_{fag}}{\partial \phi} = 0 \quad \text{Formula 5}$$

Calculating formula 5 yields formula 6.

$$-(1-\lambda)\frac{\partial p(\phi)}{\partial \phi}\frac{\partial q(\theta)}{\partial \theta} + (1-\lambda)\frac{\partial p(\theta)}{\partial \theta}\frac{\partial q(\phi)}{\partial \phi} = 0 \quad \text{Formula 6}$$

Formula 6 always holds when q=0. The shape obtained when q=0 in formula 4 is an envelope curve of the external tooth addendum profile group. Setting φ to θ in formula 4 yields formula 7.

$$\begin{bmatrix} x_{fag}(\phi = \theta) \\ y_{fag}(\phi = \theta) \end{bmatrix} = \begin{bmatrix} \lambda p(\theta) + (1-\lambda)p\left(\frac{\pi}{2}\right) \\ \lambda q(\theta) + (1-\lambda)q\left(\frac{\pi}{2}\right) \end{bmatrix} \quad \text{Formula 7}$$

Comparing formula 7 with formula 2, the envelope curve of the addendum profile of the external teeth is congruent with the addendum profile of the internal teeth, proving that if the addendum profiles of the internal teeth and the external teeth are set as shown in formulas 2 and 3, a wide range of continuous contact is possible between the internal teeth and the external teeth.

[Tooth Profile Designing Technique of Present Invention]

In the tooth profile designing technique of the present invention, the tooth profiles are set as follows.

(Addendum Profile of External Teeth 30)

As with the IH tooth profile technique described above, the rotation angle of the wave generator 4 of the strain wave gearing 1 is designated as φ, and the description below shall be focused on the internal teeth 20 of the internally toothed gear 2 and the external teeth 30 of the externally toothed gear 3 on the major axis when φ=0. The locus over which the external teeth 30 move with respect to the internal teeth 20, which is obtained when the wave generator is caused to rotate between 0 and π/2, is designated as curve I (first curve) (formula 1 remains unchanged).

$$\begin{bmatrix} x_I \\ y_I \end{bmatrix} = \begin{bmatrix} p(\phi) \\ q(\phi) \end{bmatrix} \quad 0 \leq \phi \leq \frac{\pi}{2} \quad \text{Formula 1}$$

The endpoint of curve I when φ=0 is designated as point A, the endpoint when φ=π/2 is designated as point B, and the midpoint between point A and point B is designated as point C. Thus far, the present technique is the same as the IH tooth profile technique.

Using point B as the center of similarity, curve I is multiplied by (1−λ) to obtain a similarity curve. The similarity curve is rotated 180 degrees about point C to determine a second curve.

Only the x coordinate of the second curve is multiplied by α to obtain a third curve (formula 8). The third curve is used to define the addendum profile of the external teeth 30. In formula 8, θ is a parameter representing the tooth profile shape.

$$\begin{bmatrix} x_{fa} \\ y_{fa} \end{bmatrix} = \begin{bmatrix} \alpha\{-(1-\lambda)p(\theta) + p(0) + (1-\lambda)p\left(\frac{\pi}{2}\right)\} \\ -(1-\lambda)q(\theta) + q(0) + (1-\lambda)q\left(\frac{\pi}{2}\right) \end{bmatrix} \quad 0 \leq \theta \leq \frac{\pi}{2} \quad \text{Formula 8}$$

The addendum profile of the external teeth 30 can also be defined using the fourth curve determined as follows, instead of the third curve. Specifically, curve I is multiplied by (1−λ) using point B as the center of similarity to determine a similarity curve, the similarity curve is rotated 180 degrees about point C to determine the second curve, and then only the y coordinate of the second curve is multiplied by β to obtain a fourth curve (formula 9). The fourth curve is used to define the addendum profile of the external teeth 30.

$$\begin{bmatrix} x_{fa} \\ y_{fa} \end{bmatrix} = \begin{bmatrix} -(1-\lambda)p(\theta) + p(0) + (1-\lambda)p\left(\frac{\pi}{2}\right) \\ \beta\{-(1-\lambda)q(0) + q(0) + (1-\lambda)q\left(\frac{\pi}{2}\right)\} \end{bmatrix} \quad \text{Formula 9}$$

(Addendum Profile of Internal Teeth 20)

The addendum profile of the internal teeth 20 is a tooth profile obtained by enveloping the set addendum profile of the external teeth 30.

When the addendum profile of the external teeth 30 is set as shown in formula 8, the addendum profile group of the external teeth 30 when rack approximation is performed is given by formula 10.

$$\begin{bmatrix} x_{fag} \\ y_{fag} \end{bmatrix} = \begin{bmatrix} \alpha\{-(1-\lambda)p(\theta) + p(0) + \\ (1-\lambda)p\left(\frac{\pi}{2}\right)\} + p(\phi) - \alpha p(0) \\ -(1-\lambda)q(0) + q(0) + (1-\lambda)q\left(\frac{\pi}{2}\right) + q(\phi) - q(0) \end{bmatrix} \quad \text{Formula 10}$$

The envelope condition in this case is given by formula 11.

$$-(1-\lambda)\frac{\partial p(\phi)}{\partial \phi}\frac{\partial q(\theta)}{\partial \theta} + \alpha(1-\lambda)\frac{\partial p(\theta)}{\partial \theta}\frac{\partial q(\phi)}{\partial \phi} = 0 \quad \text{Formula 11}$$

Since a solution to formula 11 cannot be obtained analytically, the relationship between φ and θ is determined by numerical calculation. By substituting the result into formula 10, the addendum profile of the internal teeth 20 can be obtained.

In addition, when the addendum profile of the external teeth 30 is set as shown in formula 9, the addendum profile group of the external teeth 30 in rack approximation is given by formula 12, and the envelope condition is given by formula 13.

$$\begin{bmatrix} x_{fag} \\ y_{fag} \end{bmatrix} = \begin{bmatrix} -(1-\lambda)p(\theta) + p(0) + (1-\lambda)p\left(\frac{\pi}{2}\right) + p(\phi) - p(0) \\ \beta\{-(1-\lambda)q(0) + q(0) + \\ (1-\lambda)q\left(\frac{\pi}{2}\right)\} + q(\phi) - \beta q(0) \end{bmatrix} \quad \text{Formula 12}$$

$$-\beta(1-\lambda)\frac{\partial p(\phi)}{\partial \phi}\frac{\partial q(\theta)}{\partial \theta} + (1-\lambda)\frac{\partial p(\theta)}{\partial \theta}\frac{\partial q(\phi)}{\partial \phi} = 0 \quad \text{Formula 13}$$

The addendum profile of the internal teeth 20 is obtained by solving formula 13 by numerical calculation and substituting the result into formula 12.

(Dedendum Profiles)

As with the IH tooth profile, the dedendum profiles of the internal teeth 20 and the external teeth 30 are set so as not to interfere with the counterpart addendum profiles.

(Effects)

In the case of formula 8, if α<1, the tooth thickness of the external teeth 30 of the externally toothed gear 3 is less than in the IH tooth profile when $\lambda$ is the same value, and the roots can be widened. Alternatively, when each $\lambda$ is adjusted so that the tooth thickness is the same, the tooth surfaces used for meshing of the external teeth 30 become wider than in the IH tooth profile. This means that the range over which the teeth are subjected to the energy of friction will be widely distributed. Furthermore, since the radius of curvature of the tooth surfaces of the external teeth 30 also increases, contact stress on the tooth surfaces decreases. These effects combine to make the tooth surfaces resistant to damage such as wear and pitting.

In the case of formula 9, when $\lambda=\lambda_0$ in formula 8, $\beta$ is greater than 1, and when $\lambda=1-\lambda_0/\beta$, the same effect as in formula 8 is obtained.

Example of Tooth Profile Design

When the ellipsoidal form of the externally toothed gear 3 is given by formula 14 in tangential polar coordinates, the moving locus when the meshing of the externally toothed gear 3 with the internally toothed gear 2 is regarded as rack meshing is represented by formula 15.

$$p = r_n + \kappa mn \cos(2\psi) \quad 0 \leq \psi \leq 2\pi \quad \text{Formula 14}$$

$$\begin{bmatrix} x_\zeta \\ y_\zeta \end{bmatrix} = \begin{bmatrix} 0.5mn(2\phi - \kappa \sin(2\phi)) \\ \kappa mn \cos(2\phi) \end{bmatrix} \quad 0 \leq \phi \leq \frac{\pi}{2} \quad \text{Formula 15}$$

p: distance from origin to tangent when a tangent is drawn to the ellipsoidal shape $r_n$: radius of perfect circle before external gear is ellipsoidally deformed φ: angle between x-axis and tangent when a tangent is drawn to the ellipsoidal shape $x_\zeta$: coordinates of rack in pitch line direction $y_\zeta$: coordinates of rack in tooth depth direction m: module n: ½ of difference in number of teeth between internally toothed gear and externally toothed gear φ: rotation angle of wave generator, congruent with @ in rack approximation K: deflection coefficient An example is given in which the tooth profile is calculated with respect to the moving locus of formula 15, where m=1, n=1 (difference in the number of teeth is 2), and κ=1.

(Comparative Example: IH Tooth Profile)

Figure 2A:
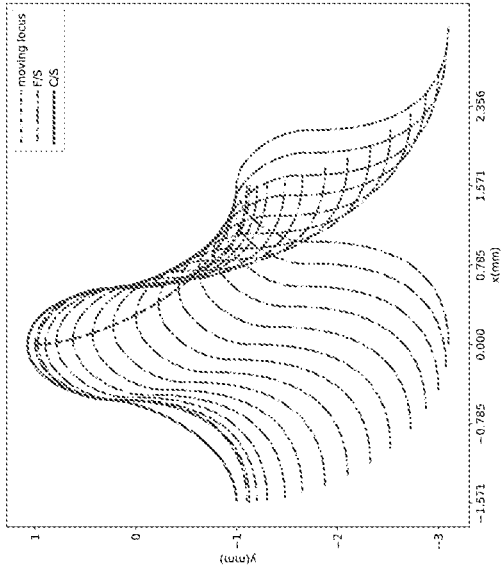
FIG. 2A is an explanatory drawing of an example of IH tooth profiles.
Figure 2B:
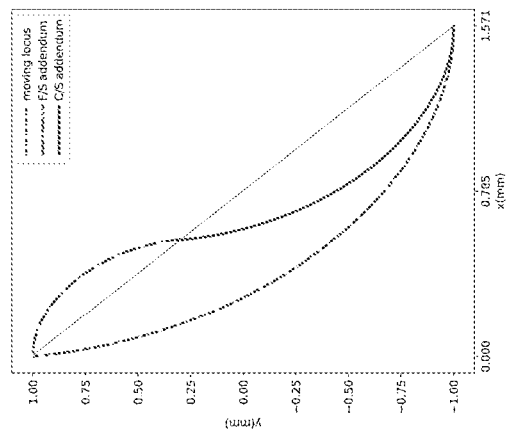
FIG. 2B is an explanatory drawing of a state of mesh in IH tooth profiles.

FIG. 2A shows the addendum profile of the external teeth and the addendum profile of the internal teeth obtained by the IH tooth profile technique when $\lambda=0.65$, along with the moving locus (φ=0 to π/2) shown in formula 15. FIG. 2B shows how the external teeth mesh with the internal teeth in this case.

(Example of Tooth Profile Proposed by Technique of Present Invention)

Figure 3A:
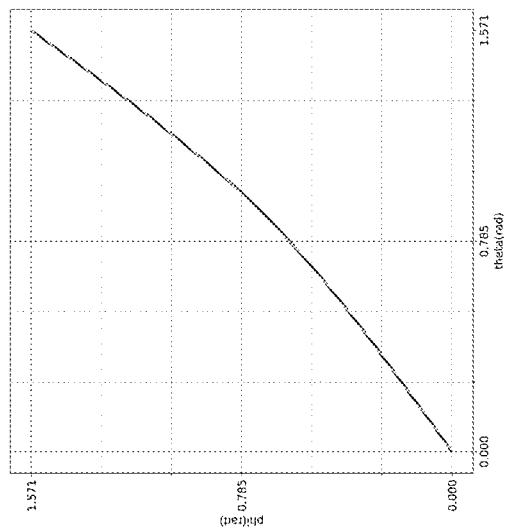
FIG. 3A is an explanatory drawing of an example of tooth profiles proposed by the present invention.

FIG. 3A shows the proposed tooth profiles (addendum profile of external teeth 30 and addendum profile of internal teeth 20) obtained by the technique of the present invention when $\lambda=0.5$ and $\alpha=0.7$, along with the moving locus (φ=0 to π/2) shown in formula 15. The tooth thicknesses in these proposed tooth profiles (x coordinates of connecting part between addendum and dedendum) are the same as the tooth thicknesses in the IH tooth profiles shown in FIG. 2A.

$$1-0.65(=1-\lambda)=0.5\times 0.7(=>\cdot\alpha)=0.35$$

Figure 3B:
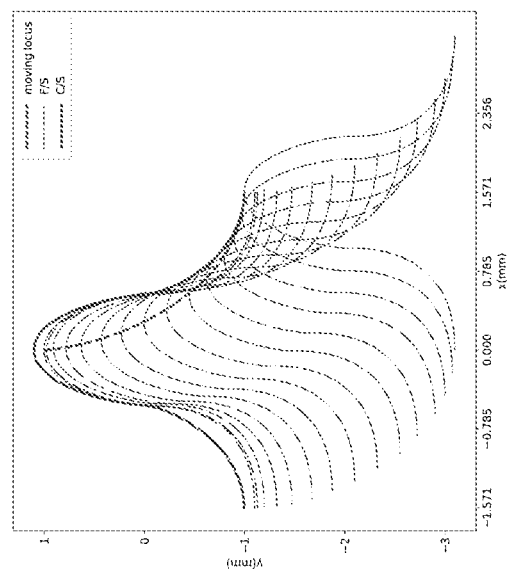
FIG. 3B is an explanatory drawing of a state of mesh of tooth profiles proposed by the present invention.
Figure 3C:
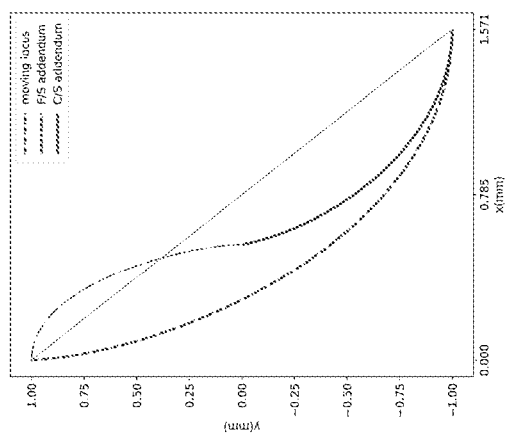
FIG. 3C is a graph of the relationship between θ and φ determined according to a numerical calculation when λ=0.5 and α=0.7.
Figure 3D:
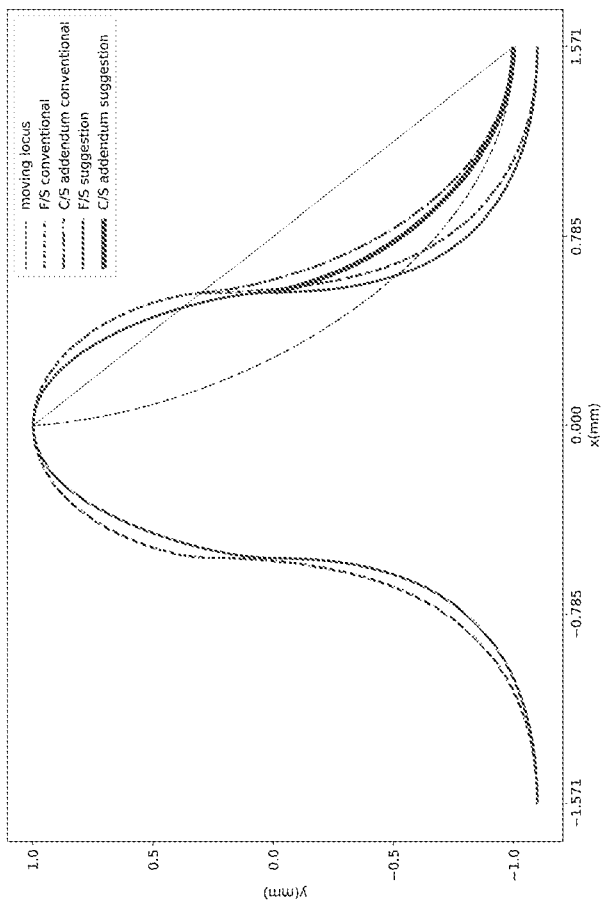
FIG. 3D is an explanatory drawing of a comparison between IH tooth profiles and tooth profiles proposed by the present invention.

FIG. 3B shows how the external teeth 30 mesh with the internal teeth 20 in this case. FIG. 3C shows the relationship between θ and φ, determined by numerical calculation when $\lambda=0.5$ and $\alpha=0.7$, in order to define the addendum profile of the internal teeth 20. FIG. 3D shows IH tooth profiles and tooth profiles proposed by the technique of the present invention.

The invention claimed is:

1. A tooth profile designing method for a strain wave gearing comprising a rigid internally toothed gear, a flexible externally toothed gear, and a wave generator that causes the externally toothed gear to flex into an ellipsoidal shape and mesh with the internally toothed gear at locations including positions on a major axis of the ellipsoidal shape, and causes positions where the externally toothed gear meshes with the internally toothed gear to move in a circumferential direction, said tooth profile designing method comprising:

designating a rotation angle of the wave generator as φ and focusing on internal teeth of the internally toothed gear and external teeth of the externally toothed gear positioned on the major axis when φ=0, a locus over which the external teeth move with respect to the internal teeth, obtained while the wave generator is rotating from φ=0 to φ=φ1 (0<φ1≤π/2), is determined as a first curve;

designating an endpoint of the first curve when φ=0 as point A, an endpoint when φ=φ1 as point B, a midpoint between point A and point B as point C, and $\lambda$ as a positive value less than 1, a similarity curve for which the first curve is multiplied by (1−$\lambda$) using point B as a center of similarity is determined, and a second curve for which the similarity curve is rotated 180 degrees about the point C is determined;

designating a as a positive value less than 1 and β as a positive value greater than 1, and also designating a curve obtained by multiplying only the x coordinate of the second curve by α as a third curve and a curve obtained by multiplying only the y coordinate of the second curve by β as a fourth curve, either one of the third curve and the fourth curve is determined and an addendum profile of the external teeth is defined using the determined curve;

an addendum profile of the internally toothed gear is defined by a curve enveloping the addendum profile of the external teeth; and a dedendum profile of the external teeth and a dedendum profile of the internal teeth are each set to a shape that does not interfere with a counterpart addendum profile.

2. The tooth profile designing method according to claim 1, wherein designating a as a positive value less than 1 and β as a positive value greater than 1, and also designating a curve obtained by multiplying only the x coordinate of the second curve by α as a third curve and a curve obtained by multiplying only the y coordinate of the second curve by β as a fourth curve, the third curve is determined and an addendum profile of the external teeth is defined using the determined curve.

3. The tooth profile designing method according to claim 1, wherein designating a as a positive value less than 1 and β as a positive value greater than 1, and also designating a curve obtained by multiplying only the x coordinate of the second curve by α as a third curve and a curve obtained by multiplying only the y coordinate of the second curve by β as a fourth curve, the fourth curve is determined and an addendum profile of the external teeth is defined using the determined curve.

\* \* \* \* \*